(12) United States Patent
Huang et al.

(10) Patent No.: US 6,954,299 B1
(45) Date of Patent: Oct. 11, 2005

(54) CONTROLLING SYSTEM WITH FIXED FREQUENCY DRIVER FOR CONTROLLING AN ELECTROCHROMIC ELEMENT AND METHOD FOR THE SAME

(75) Inventors: Tai-Hsiung Huang, Taoyuan (CN); Shun-Hsiang Hsiao, Taoyuan (CN); Wen-Wei Su, Taoyuan (CN); Kuei-Hung Chen, Taoyuan (CN)

(73) Assignee: Exon Science Incorporation, Taipei (TW)

( * ) Notice: Subject to any disclaimer, the term of this patent is extended or adjusted under 35 U.S.C. 154(b) by 5 days.

(21) Appl. No.: 10/813,155

(22) Filed: Mar. 31, 2004

(51) Int. Cl.⁷ .............................................. G02F 1/15
(52) U.S. Cl. ..................................... 359/265; 359/267
(58) Field of Search ............................. 359/265, 267, 359/239, 601, 603, 604, 614, 843, 844, 630, 359/633; 345/7, 8, 9, 105, 107

(56) References Cited

U.S. PATENT DOCUMENTS 6,501,457 B1 * 12/2002 Bruechmann et al. ...... 345/105

\* cited by examiner

*Primary Examiner*—Hung Xuan Dang
*Assistant Examiner*—Tuyen Tra
(74) *Attorney, Agent, or Firm*—Sughrue Mion, PLLC

(57) ABSTRACT

A controlling system and method for controlling an electrochromic element, utilizes a simplified architecture, including at least a microcontroller, a A/D converter and a charging circuit, to reduce complexity of the whole system for reaching both of a respond time and cost savings for the electrochromic element. And the controlling system and method only utilizes a fixed frequency to drive the electrochromic element for reaching a better reliability than a variable duty cycle driver used in prior art.

19 Claims, 5 Drawing Sheets

CONTROLLING SYSTEM WITH FIXED FREQUENCY DRIVER FOR CONTROLLING AN ELECTROCHROMIC ELEMENT AND METHOD FOR THE SAME

BACKGROUND OF THE INVENTION

1. Field of the Invention

The present invention relates to a controlling system and method for controlling an electrochromic element, and more particularly in to a controlling system and method using a fixed frequency for driving a reflectance of an electrochromic element.

2. Description of the Prior Art

As known, various electrochromic elements, i.e. electrochromic mirror and window systems applied in automotive applications, are being widely used. Relatively, several apparatus for controlling the reflectance of said electrochromic elements are progressively developed. For example, U.S. Pat. No. 6,084,700 as illustrated in FIGS. 1 and 2, discloses that an electrical circuit utilizes active loading or voltage feedback of electrochromic element to control a reflectance of an electrochromic element. The electrical circuit provided a programmable microcontroller is capable of generating a variable duty cycle driver to adjust the current voltage of electrochromic elements. In illustration of FIG. 1, the microcontroller gets an element voltage with a PWM (pulse width modulated signal) input voltage during measurement and therefore looks up a corresponding output voltage target pre-stored in a lookup table of the microcontroller. Furthermore, the microcontroller compares the output voltage target with said element voltage to increase/decrease the PWM input duty cycle as forming the variable output duty cycle. The flowchart for software PWM installed in the microcontroller is illustrated in FIG. 2. However, there are several problems in use of the variable output duty cycle for electrochromic element. It is over complexity in design and therefore possibly makes unreliable.

SUMMARY

It is an object of the present invention to provide a controlling system and method for controlling an electrochromic element.

It is a further object of the present invention to provide a controlling system and method for controlling an electrochromic element, which utilizes a simplified architecture to reduce complexity of the whole system for reaching both of a respond time and cost savings for electrochromic element.

It is a further object of the present invention to provide a controlling system and method for controlling an electrochromic element, which only utilizes a fixed frequency to drive the electrochromic element for reaching a better reliability than said variable duty cycle driver used in prior art.

Briefly summarized, the present invention relates to a controlling system for controlling a reflectance of an electrochromic element. The controlling system includes an analog-to-digital (A/D) converter, a microcontroller, a charging circuit and a amplifier. Meanwhile, the A/D converter is capable of reading out an averaged voltage before the averaged voltage is applied on the electrochromic element, and then transforming said averaged voltage. And, the microcontroller is provided with at least a programmable memory for storing a look up table and a PWM unit for providing a PWM function. The microcontroller is used to receive a input averaging voltage transformed from the A/D converter and then determines whether an output voltage with a fixed frequency in PWM signal form is relatively generated, by way of looking up several corresponding output voltages pre-stored in the look up table for each input averaging voltage, and only judges whether the input averaged voltage is less than the pre-stored output voltage. When the input averaged voltage is in contrast of being less than the pre-stored output voltage, the output voltage is set low and therefore the charging circuit is disabled by the microcontroller to release overloading voltages in the electrochromic element for controlling the reflectance. The amplifier is used for amplifying an output voltage with fixed frequency generated from the PWM unit of the microcontroller.

Each of the circuits in accordance with the present invention is adapted to be used to control the reflectance of an electrochromic element as a function of the voltage across the element. Such electrochromic elements are described in detail as in U.S. Pat. No. 4,917,477. Such electrochromic elements are adapted to be controlled typically between 0 to 3 volts to control the reflectance. As described herein, the electrochromic elements may be liquid phase, self-erasing electrochromic mirrors used in automobile applications.

Furthermore, the present invention relates to a controlling method for controlling a reflectance of an electrochromic element. The controlling method includes the following steps:

a A/D converter reading out an averaged voltage before the averaging voltage applied in the electrochromic element for transforming the averaged voltages;

looking up a corresponding output target voltage in the look up table that pre-stored several required output target voltages corresponding to each input averaged voltage from the A/D converter;

only determining whether the input averaged voltage is less than the output target voltage to generate the PWM output voltage with a fixed frequency in PWM signal form by way of the PWM unit; and setting the output voltage low and releasing overloading voltages in the electrochromic element by way of disabling a charging circuit when the input averaged voltage is in contrast of being less than the pre-stored output voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWING

These and other objects of the present invention will be readily understood with reference to the following specification and attached drawing, wherein.

DETAILED DESCRIPTION

Differently from the prior art as mentioned above, the present invention relates to an controlling system for an electrochromic element driven by a pulse width modulated (PWM) signal which incorporates averaging of the modulated signal before the modulated signal is applied to the electrochromic element (hereinafter detailed).

Figure 3:
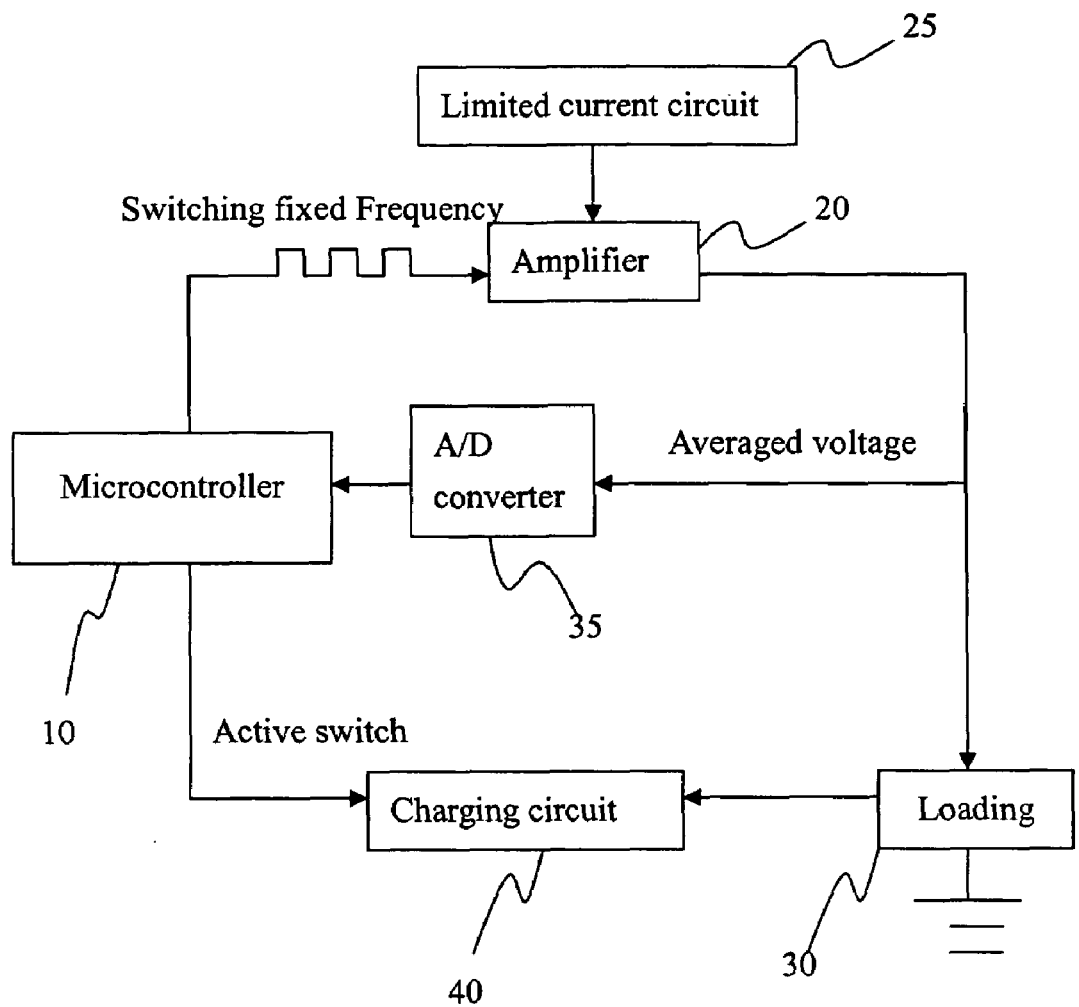
FIG. 3 is a schematic diagram of an electronic circuit according to one preferred embodiment of the present invention for providing a PWM output signal with use of fixed frequency to controlling an electrochromic element.

Referring first to illustration in FIG. 3, the controlling system according to a preferred embodiment of the present invention, has a simplified architecture and therein includes a microcontroller 10, an amplifier 20, an analog-to-digital (A/D) converter 35, and a charging circuit 40.

Meanwhile, said microcontroller 10 is further provided with at least a programmable memory like ROM for pre-setting a look up table thereon, and a PWM unit for providing PWM function. The amplifier 20 is electrically coupled with a limited current circuit 25 for amplifying a PWM output signal with fixed frequency generated from PWM unit of the microcontroller 10. The A/D converter 35 can read out an averaged voltage before the averaging voltage applied in a loading 30 as the electrochromic element and then provides the microcontroller 10 with said input averaged voltage. The charging circuit 40 consisting of a numbers of resistors and capacitors is electrically coupled with the microcontroller 10 and applied to release the overloading voltages in the loading 30 when charging circuit 40 is disabled by way of determination of the microcontroller 10 to make an active switch.

Figure 4:
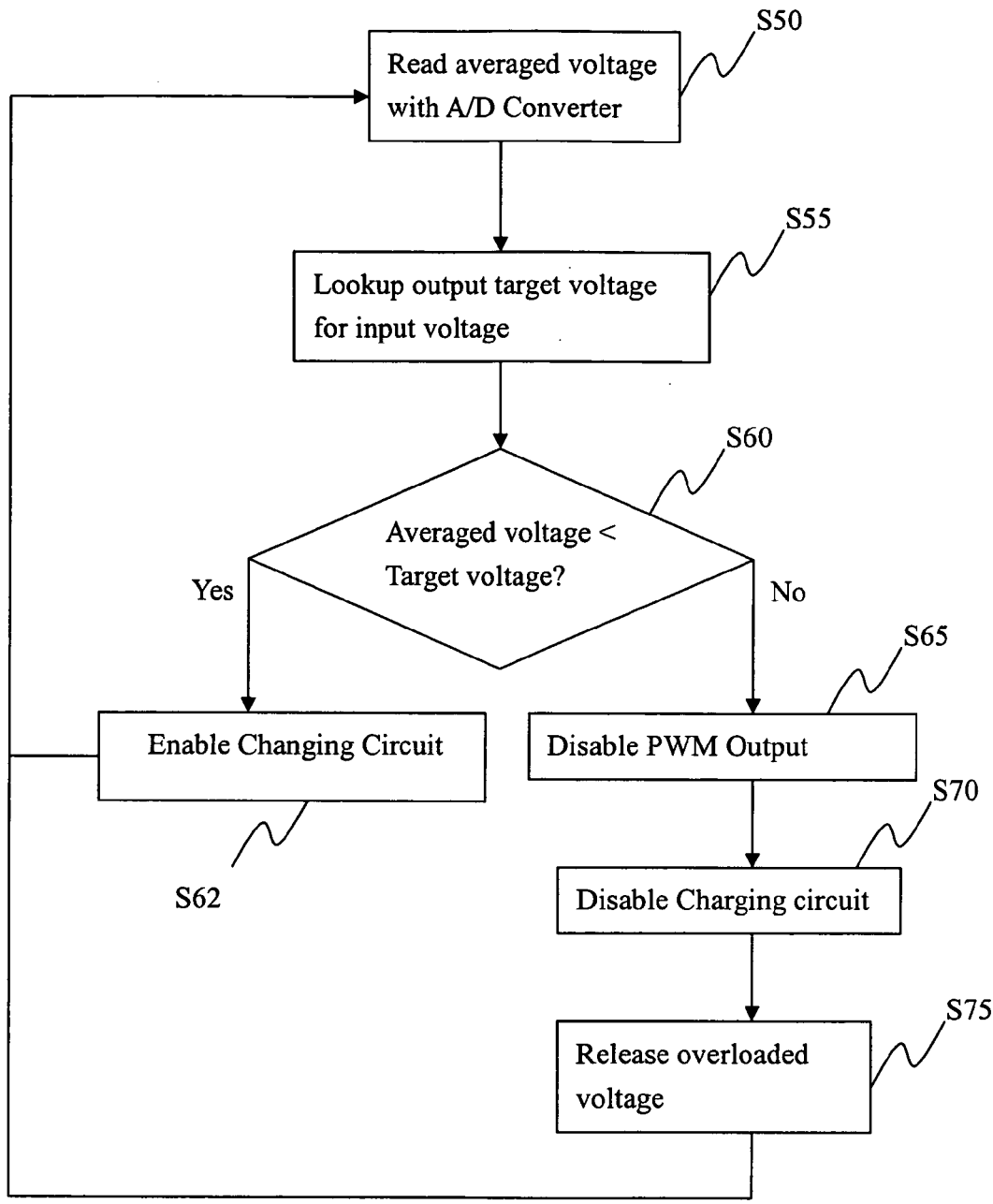
FIG. 4 is a flow chart for an input process in accordance with the preferred embodiment of the invention, which disables a charging circuit for reducing overloading voltage of the electrochromic element.

Referring further to illustration in FIG. 4, a flow chart for a method for rapidly controlling a reflectance of an electrochromic element. Initially, in step S50 the A/D converter 40 can read the averaged voltage before the averaging voltage applied in a loading 30 as the electrochromic element, for transforming the averaged voltages and ensuring the current voltage of the circuit.

In the step S55, a corresponding output target voltage is looked up in the look up table that pre-stored several required output target voltages corresponding to each input averaged voltage including said averaged voltage.

Figure 5:
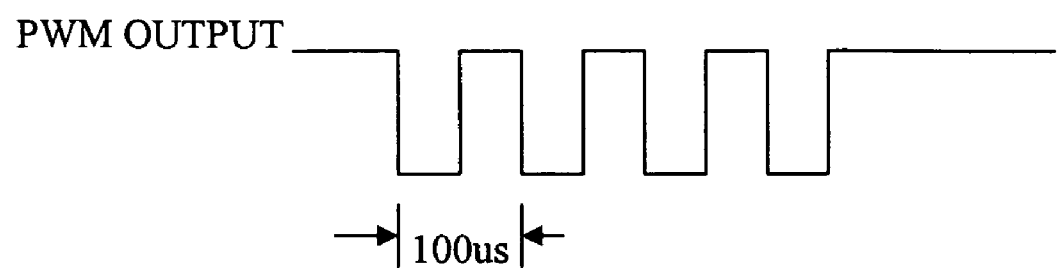
FIG. 5 is a graphical illustration of the PWM output signal with use of fixed frequency according to the preferred embodiment of the present invention.

In the step S60, it is further determined whether the input averaged voltage is less than the output target voltage. If so, an output voltage with a fixed square frequency in PWM signal form, as described in step S62, is generated by the PWM unit of the microcontroller 10. As shown in FIG. 5, the graphical illustration of the PWM output signal with use of fixed frequency, of which each duty cycle takes the time of 100 us.

In contrast, the PWM output signal is set "low" as described in step S65 so that the charging circuit is disabled by the microcontroller 10 to release overloading voltages in the loading 30 as described in steps S70 & S75. In this way, the averaged voltage is able be controlled by the Fix frequency as required.

Figure 1:
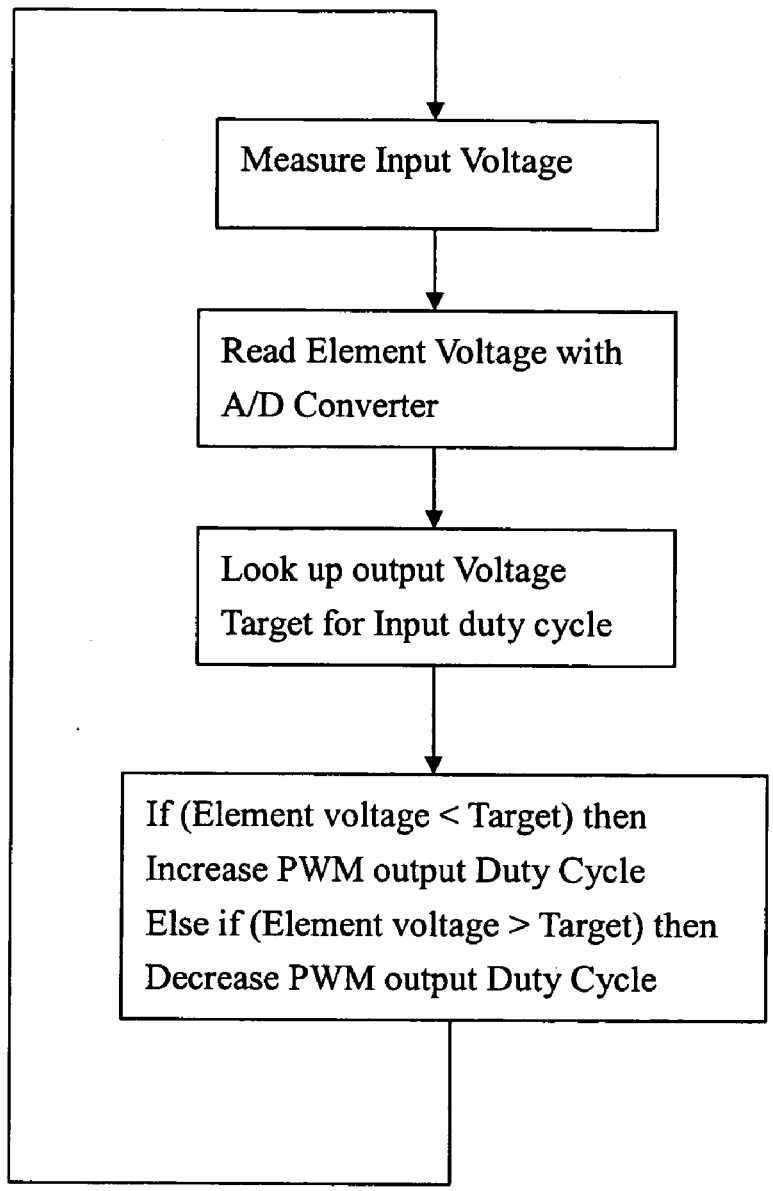
FIG. 1 is a flow chart for an input routine of a prior art that utilizes voltage feedback.
Figure 2:
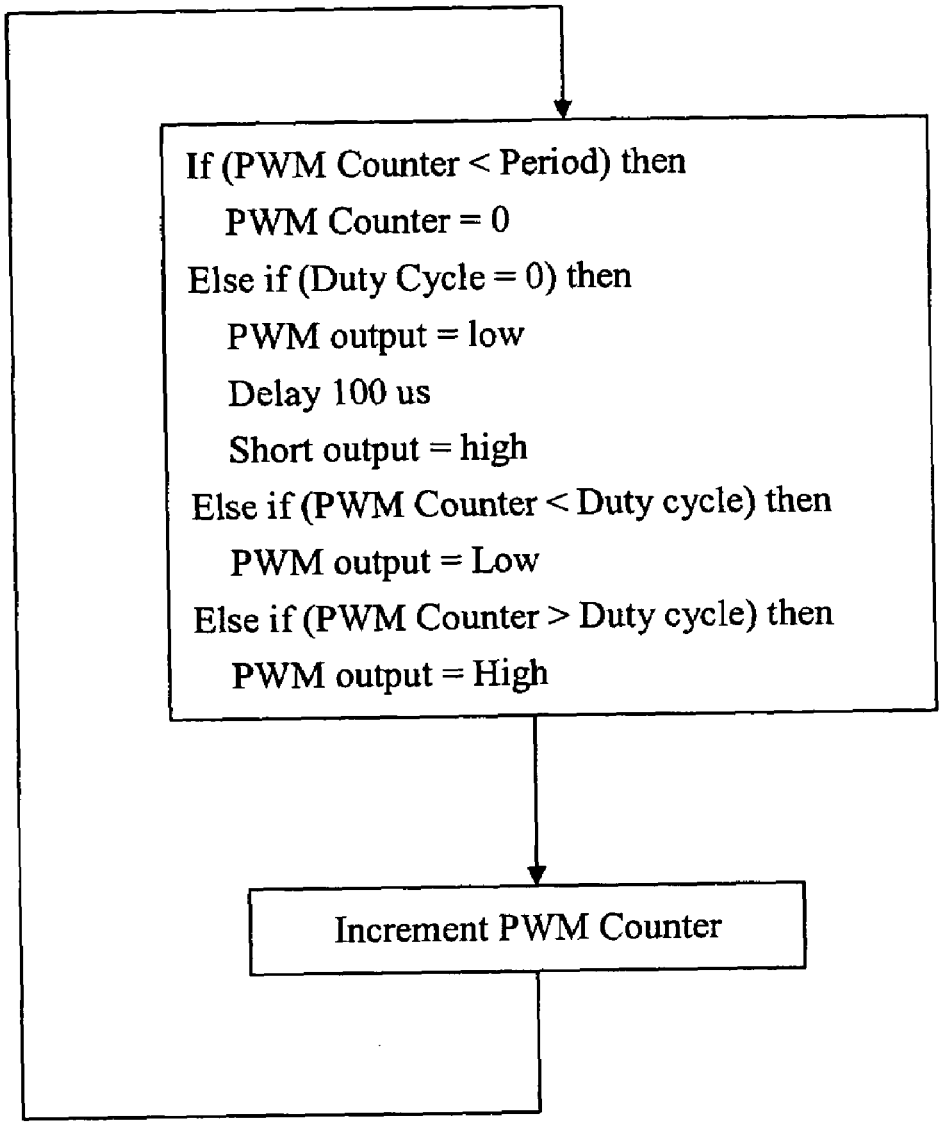
FIG. 2 is a flow chart for software PWM of the prior art that utilizes voltage feedback.

It is noted that each action of said steps S60, S62, S65, and S70 optimally can be implemented by at least a program pre-stored in the programmable ROM of the microcontroller 10. Therefore, various parameters i.e. the corresponding voltages can be pre-adjusted or pre-modified on demand via the program. In comparison with the prior art shown in FIGS. 1 & 2, the present invention has better response time saving due to simplified architecture design in both of hardware and software.

In conclusion, the controlling system and method for controlling an electrochromic element, according to the present invention, can reduce complexity of the whole system due to only need of generation of fixed frequency, rather than a variable duty cycle as the prior art, thereby reaching both of a respond time and cost savings of the electrochromic element. Simultaneously, the simplified architecture design can further facilitate a better reliability than said variable voltage driver for the electrochromic element.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A controlling system for controlling a reflectance of an electrochromic element, including:
    an analog-to-digital converter reading an averaged voltage before the averaged voltage is applied on the electrochromic element, and then transforming said averaged voltage;
    a microcontroller provided with at least a look up table and a PWM unit for providing a PWM function, receiving a input averaging voltage transformed from the analog-to-digital converter and then determining whether an output voltage with a fixed frequency in PWM signal form is relatively generated, by way of looking up several corresponding output voltages pre-stored in the look up table for the voltage of input signal and only judging whether the input averaged voltage is less than the pre-stored output voltage; and
    a charging circuit capable of being disabled by the microcontroller to release overloading voltages in the electrochromic element when the input averaged voltage is in contrast of being less than the pre-stored output voltage.

2. The controlling system as described in claim 1 wherein the look up table is pre-set in a programmable memory located in the microcontroller.

3. The controlling system as described in claim 2 further including an amplifier for amplifying an output voltage with fixed frequency generated from PWM unit of the microcontroller.

4. The controlling system as described in claim 3 wherein the output voltage is set low by microcontroller when the input averaged voltage is in contrast of being less than the pre-stored output voltage.

5. The controlling system as described in claim 1 wherein the electrochromic element is an electrochromic mirror with variable reflection rate.

6. The controlling system as described in claim 4 wherein the electrochromic element is an electrochromic mirror with variable reflection rate.

7. The controlling system as described in claim 1 further including an amplifier for amplifying an output voltage with fixed frequency generated from PWM unit of the microcontroller.

8. A controlling method for controlling a reflectance of an electrochromic element, including the steps of:
    a A/D converter reading an averaged voltage before the averaging voltage applied in the electrochromic element for transforming the averaged voltages;
    looking up a corresponding output target voltage in the look up table that pre-stored several required output target voltages corresponding to a PWM averaged voltage from the A/D converter; and
    only determining whether the input averaged voltage is less than the output target voltage to generate the PWM output voltage with a fixed frequency in PWM signal form by way of a PWM unit.

9. The controlling method as described in claim 8 further including the step of: setting the output voltage low when the input averaged voltage is in contrast of being less than the pre-stored output voltage.

10. The controlling method as described in claim 9 further including the step of: releasing overloading voltages in the electrochromic element by way of disabling a charging circuit when the input averaged voltage is in contrast of being less than the pre-stored output voltage.

11. A controlling circuit for controlling an electronic device, comprising:
   an input signal providing an averaged voltage before the averaged voltage is applied on the electronic device;
   a microcontroller provided with at least a look up table and a PWM unit for providing a PWM function, receiving the input averaging voltage and then determining whether an output voltage with a fixed frequency in PWM signal form is relatively generated, by way of looking up several corresponding output voltages pre-stored in the look up table for each input averaging voltage and only judging whether the input averaged voltage is less than the pre-stored output voltage; and
   a driving circuit capable of being disabled by the microcontroller to release overloading voltages in the electronic device when the input averaged voltage is in contrast of being less than the pre-stored output voltage.

12. The controlling circuit as described in claim 11 wherein the input signal is an analog signal and processed by an analog-to-digital converter then transformed into a digital signal.

13. The controlling circuit as described in claim 12 wherein the electronic device is an electrochromic mirror used in automobile applications.

14. The controlling circuit as described in claim 13 wherein the electrochromic mirror is a liquid phase, self-erasing electrochromic mirror.

15. The controlling circuit as described in claim 14 wherein the driving circuit is a charging circuit capable of being disabled by the microcontroller to release overloading voltages in the liquid phase, self-erasing electrochromic mirror.

16. The controlling circuit as described in claim 11 wherein the look up table is pre-set in a programmable memory located in the microcontroller.

17. The controlling system as described in claim 16 further including an amplifier for amplifying an output voltage with fixed frequency generated from PWM unit of the microcontroller.

18. The controlling system as described in claim 17 wherein the output voltage is set low by microcontroller when the input averaged voltage is in contrast of being less than the pre-stored output voltage.

19. The controlling circuit as described in claim 11 further including an amplifier for amplifying an output voltage with fixed frequency generated from PWM unit of the microcontroller.

* * * * *